United States Patent [19]
Spencer

[11] Patent Number: 5,855,731
[45] Date of Patent: Jan. 5, 1999

[54] STERILE CONTAINMENT WELDING DEVICE FOR PLASTIC TUBES

[75] Inventor: Dudley W. C. Spencer, Wilmington, Del.

[73] Assignee: Denco, Inc., Wilmington, Del.

[21] Appl. No.: 932,049

[22] Filed: Sep. 17, 1997

[51] Int. Cl.$^6$ .................................................. B29C 65/18
[52] U.S. Cl. ........................ 156/503; 156/158; 156/499
[58] Field of Search ................................ 156/157, 158, 156/304.1, 304.2, 304.6, 322, 499, 502, 503, 507, 580

[56] References Cited

U.S. PATENT DOCUMENTS

| | | | |
|---|---|---|---|
| 4,897,138 | 1/1990 | Shaposka et al. | 156/158 |
| 4,913,756 | 4/1990 | Shaposka et al. | 156/158 |
| 5,256,229 | 10/1993 | Spencer | 156/158 |
| 5,397,425 | 3/1995 | Ivansons et al. | 156/503 |
| 5,525,186 | 6/1996 | Ivansons et al. | 156/503 |

*Primary Examiner*—James Sells
*Attorney, Agent, or Firm*—Connolly & Hutz

[57] ABSTRACT

A sterile containment welding device for plastic tubes includes a pair of alignable tube holders each of which includes a base having a tube receiving channel and a clamping jaw pivotally mounted to the base. The outer end of the tube receiving channel is outwardly flared preferably at an angle of about 14°.

11 Claims, 3 Drawing Sheets

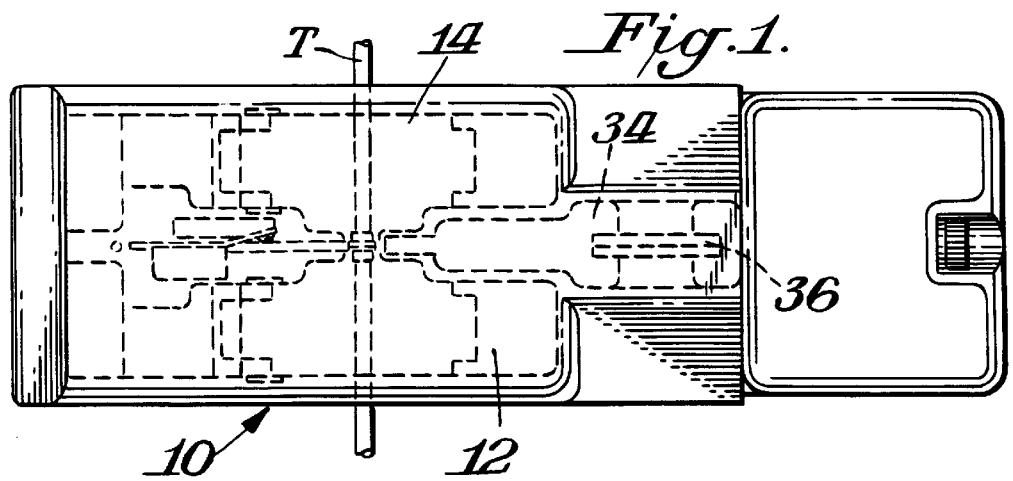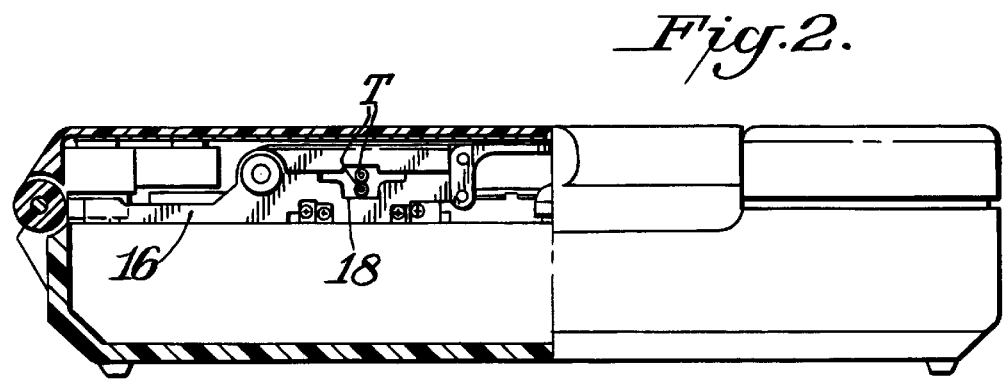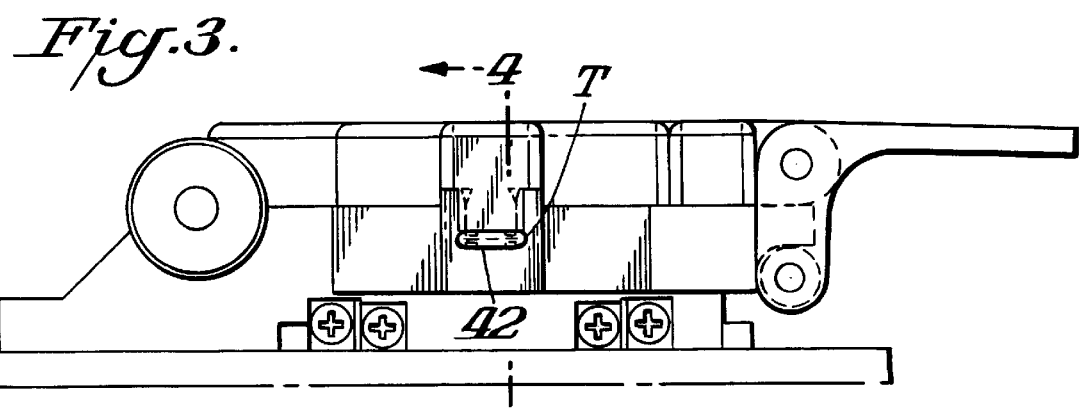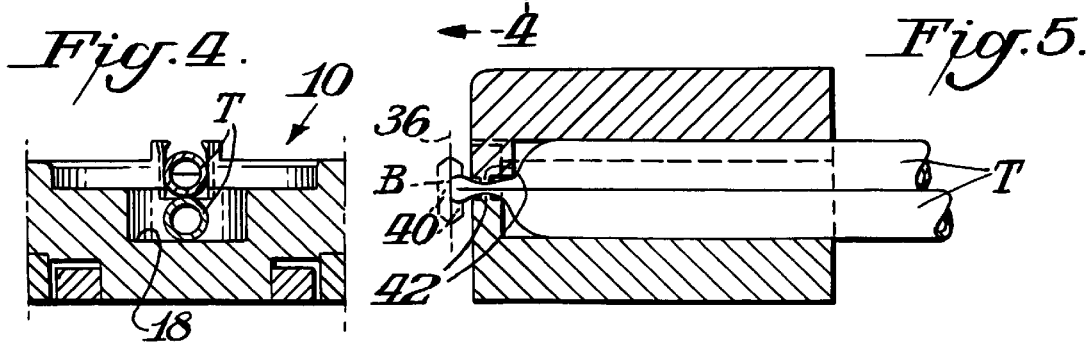

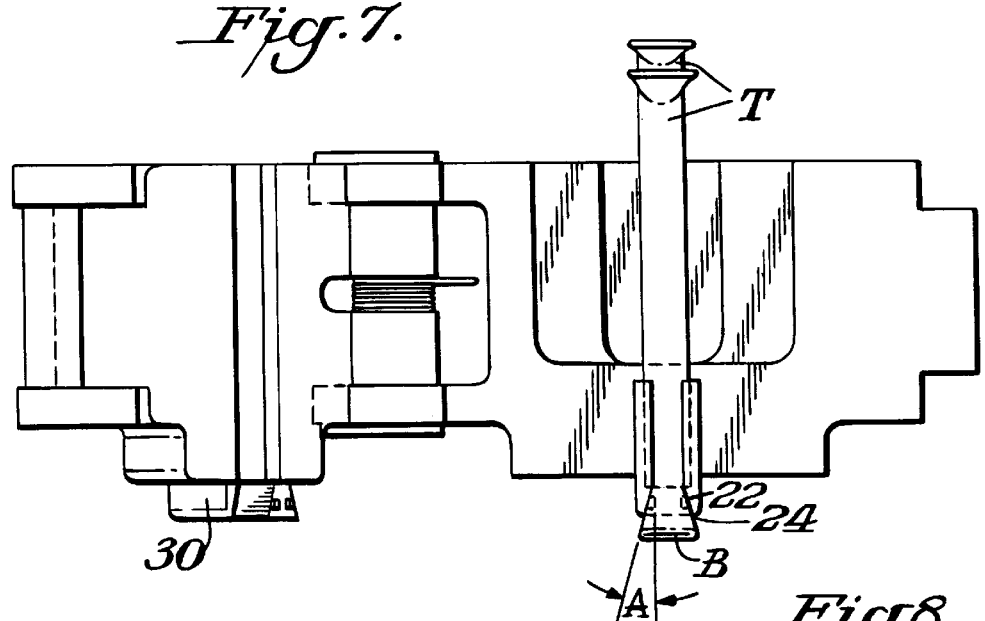
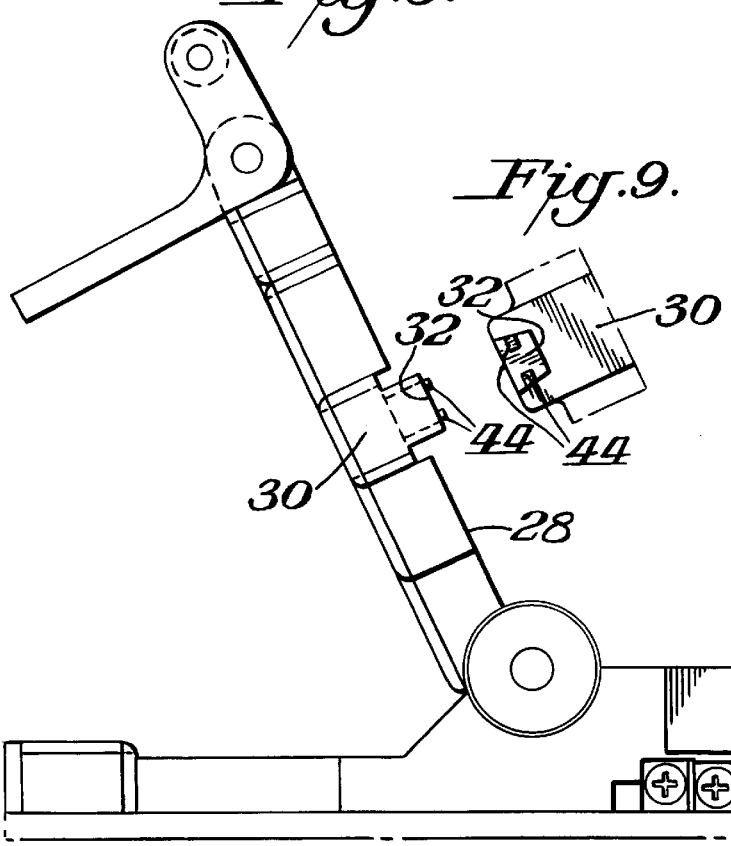
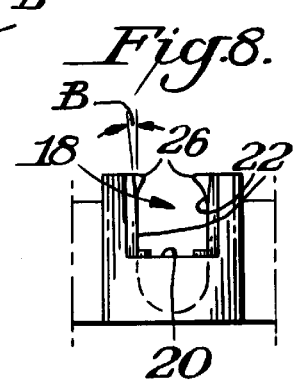

STERILE CONTAINMENT WELDING DEVICE FOR PLASTIC TUBES

BACKGROUND OF THE INVENTION

Sterile containment welding devices are known for connecting and disconnecting plastic tubes. Examples of such devices are found in U.S. Pat. Nos. 5,256,229, 5,279,685 and 5,397,425. In general, such devices include a pair of tube holders which would be in alignment with each other. Each of the tube holders has a base with the tube receiving channel into which a plastic tube would be placed. Each tube holder also includes a clamping jaw having a ram and anvil located above the channel. Thus, for example, when a tube is placed in the channel the clamping jaw is moved into locking engagement with the base and the anvil presses against the tube. In one practice of such devices each tube is placed in its channel in a bent condition by being bent upon itself with the bend of the tube extending outwardly from the outer edge of the channel. Thus, in a connect procedure the pair of bent ends would be disposed toward each other with each bent section in alignment with a corresponding bent section of the opposite tube holder. The connect procedure is achieved by passing a heated wafer between the two bent tube ends which causes the tube ends to melt so that a tube section from each tube can be pressed into contact with a corresponding tube section from the other tube and thereby join the two sets of tube sections together.

For optimum practice with such devices there should be some assurance that the bent tubes are properly located with respect to each other so that the wafer performs in its intended manner by removing the precise amount of exposed bent tube. Various devices such as locators or separators have been suggested to achieve this purpose.

SUMMARY OF THE INVENTION

An object of this invention is to provide a sterile containment welding device which properly locates a bent tube in its tube receiving channel.

A further object of this invention is to provide such a device which simplifies the loading of a bent tube in its tube receiving channel.

In accordance with this invention a sterile containment welding device of the above type is provided which includes a pair of alignable tube holders each of which has a base with a tube receiving channel. The tube receiving channel is defined by a bottom wall and upstanding side walls and by an outer end so that a plastic tube may be placed in the channel and extend outwardly of the outer end. Each of the tube holders also includes a clamping jaw having an anvil located above the channel for pressing against the tube. In accordance with this invention the walls of the channel are outwardly flared at the outer end at an angle of about 14°. This taper automatically locks the tube in place and simplifies loading. In this respect when a tube is bent upon itself there is a slight outward flare at the bend. The taper in the channel accommodates the outward flare so that the tube may be easily loaded by placing the tube in the channel and then bending the tube upon itself. The exact initial location of the tube is not critical because all that is necessary to properly locate the tube would be to pull the bent tube inwardly whereupon the tapered outer end of the channel serves to lock the tube in place at the precise intended location. Such intended location would be such that, where a wafer having scoops is used, the scoops would remove sufficient material at each bend to properly locate the remaining tube sections with respect to each other.

THE DRAWINGS

FIG. 1 is a top plan view of a sterile containment welding device in accordance with this invention;

FIG. 2 is a side elevational view partly broken away of the device shown in FIG. 1;

FIG. 3 is an enlarged fragmental view showing the clamping mechanism in the device of FIGS. 1–2;

FIG. 4 is a cross-sectional view taken through FIG. 3, along the line 4—4;

FIG. 5 is a cross-sectional elevational view of the clamping mechanism shown in FIGS. 3–4;

FIG. 6 is a side elevational view of the device of FIGS. 1–5 showing the clamping jaw in its open position;

FIG. 7 is a top plan view of the device shown in FIG. 6;

FIG. 8 is an end elevational view showing the outer end of the tube receiving channel;

FIG. 9 is an end elevational view showing a portion of the clamping mechanism;

DETAILED DESCRIPTION

Figure 10:
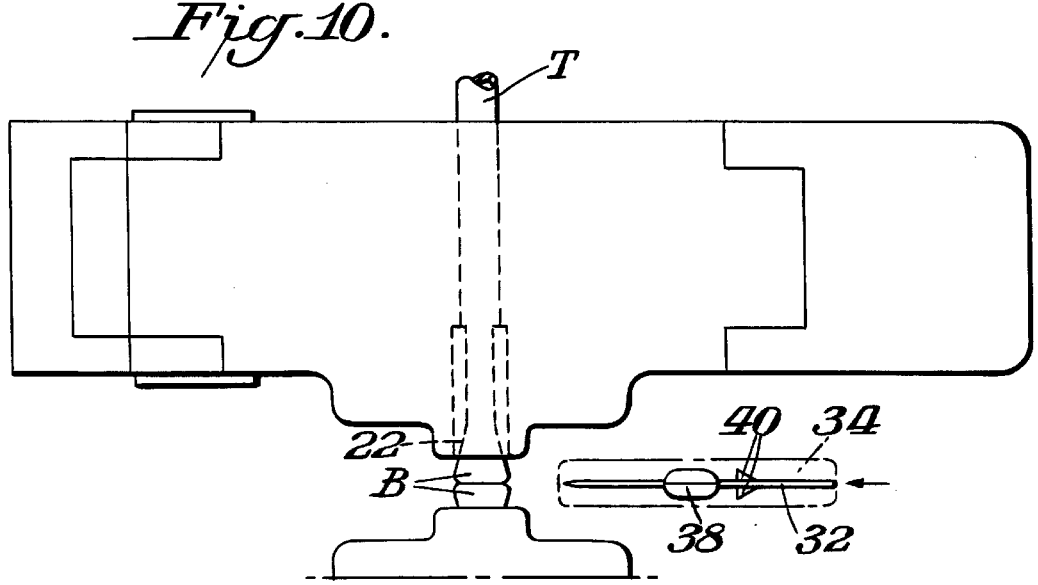
FIG. 10 is a plan view showing clamped tubes when the clamping jaw is in its closed position and showing the positioning of a wafer.

The present invention relates to variations in sterile containment welding devices for plastic tubes. Reference is made to U.S. Pat. Nos. 5,256,229, 5,279,685, 5,397,525 and 5,525,186, all of the details of which are incorporated herein by reference thereto and which show various types of structures with which the invention may be used.

In general, the device 10 includes a pair of tube holders 12,14. Each tube holder has a base 16 with a tube receiving channel 18. As shown in FIGS. 7–8 channel 18 is defined by a bottom wall 20 and side walls 22,22. Channel 18 also includes an outer end 24. A tube T would be placed in channel 18. The upper ends 26 of walls 22,22 are inclined toward each other to effectively hold the tube within the channel 18.

Each tube holder also includes an upper clamping jaw 28 having a ram 30 with an outwardly extending anvil 32 located for being pressed into the channel 18.

As best shown in FIGS. 4–5 when the device 10 is to be used in a connect procedure tube T is placed in channel 18 and bent upon itself with the bent portion B extending outwardly from the outer end of channel 18.

Device 10 also includes a wafer 36 which is mounted in a carriage 34 as shown in FIG. 1. Wafer 36 is located to move between the pair of bent ends B,B extending outwardly from the aligned channels. FIGS. 10–14 show details of the preferred wafer 36. As indicated therein wafer 36 would be of the type disclosed in U.S. Pat. No. 5,525,186 which includes the wafer body having outwardly extending aligned wings 38 and aligned scoops 40. Wafer 36 is heated so that it melts through the exposed ends B,B as shown in FIG. 10. This action is achieved by pressing the tubes T,T toward each other to urge the bent portions B,B into contact with the heated sides of wafer 36 and thereby melt the ends B,B. The melted material is removed by scoops 40,40 which take off the exact amount of material desired. The ends of tubes T,T are again pressed toward each other to assure contact with the downstream sides of wafer 36 to reheat the ends and thereby achieve the correct temperature for the welding operation which joins the aligned tube sections together after wafer 36 has moved from contact with the tube sections.

In accordance with this invention the side walls 22,22 at the outer end of each channel 18 are outwardly tapered or flared. See FIGS. 7 and 10, the angle for the outward taper or flare is such as to take advantage of the rheology of the plastic material. In this respect, when the tube is pressed by the anvil 32 of the clamping jaw 28 the tube tends to extrude outwardly. Because of the bend during a welding process the outward extrusion also results in an inward taper from the extreme end of bent tube B inwardly such as shown in FIGS. 7 and 10. The outward flare or taper at the portion of walls 22 is indicated by the angle A in FIG. 7. In the preferred practice of this invention the angle is 14°. Other angles can be used with the preferred range being 13½°–14½°.

As a result of this taper the tube T can be inserted into the channel 18 at any location. The tube is then bent upon itself and pulled inwardly until the flared sides of the tube at bend B made contact with the tapered or flared sides 22 of channel 18. The tapered walls 22 of channel 18 then lock the bent tube in place preventing further inward movement. This locking takes place with the tube being in the precise desired location where the bend is completely outside of the channel and any air bubbles are also located in the portion of the bent tube outside the channel. A sterile connection is achieved because the clamping action of the anvil assures that there can be no flow of any fluid or liquid in the tube over the region 42 where the tube is pressed tightly against itself as shown in FIG. 5.

In accordance with a further feature of this invention the upper corner of each wall 22 at outer end 24 is outwardly inclined at the angle B shown in FIG. 8 to provide relief tolerance at the outer end of channel 18 to allow entrance of the ram 32 into the channel.

As shown in FIG. 9 the ram 30 has its anvil 32 tapered to correspond to the angle A at the outer end of channel 18. A pair of pressure pads 44,44 are also provided in ram 30.

Figure 11:
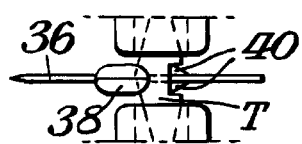
FIGS. 11–12 show two steps in the connect procedure with use of the device of FIGS. 1–10.
Figure 12:
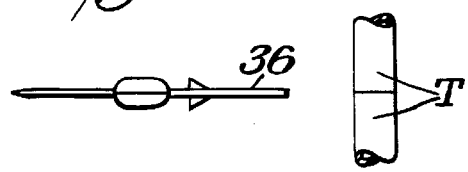
Figure 13:
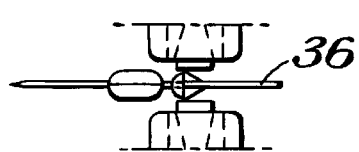
FIGS. 13–14 show two steps in the disconnect procedure with the device of FIGS. 1–10.
Figure 14:
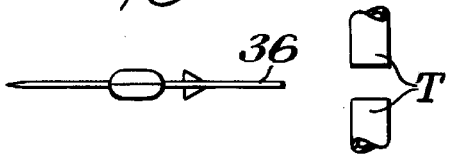

When device 10 is used in the weld or connect procedure the tubes T,T are placed in the aligned holders as shown in FIG. 10 with the bent ends B extending outwardly of each outer end of its channel. The ends are located in precisely the exact position because of the tapered sides of channel 18. Wafer 36 is heated and moved into contact with the bent ends B,B to melt the ends. As shown in FIG. 11 the material from the melted ends are removed by scoops 40,40. After the scoops pass through the tube ends, the tube sections are moved toward each other to contact the side walls of wafer 36 and maintain the tube ends heated for later welding. With the passage of wafer 36 away from the tubes T,T the tubes are moved into contact with each other thereby creating two welded tubes from the aligned tube sections.

Where device 10 is used for the disconnect procedure, a tube is simply placed in the aligned channels of the two tube holders and wafer 36 melts through the tube in the manner shown in FIG. 13 so that two separated tube sections T,T result as shown in FIG. 13.

Any suitable dimensioning may be used in the practice of this invention. For example, a tube having a 4 mm outer diameter and a 3 mm inner diameter would extrude from 0.2–2 mm. As a result of the clamping action this would result in a bend having a bubble located outwardly of the outer end of the channel 18. Such portion of the bent tube which includes the bubble should be removed when joining two tube sections together, particularly for blood tubing. The present invention assures the proper removal of the necessary amount of material to result in proper operation of the device.

What is claimed is:

1. In a sterile containment welding device for plastic tubes having a pair of alignable tube holders, each of said tube holders having a base with a tube receiving channel, said channel being defined by a bottom wall and upstanding side walls with an outer end for receiving a plastic tube in said channel and to permit the plastic tube to extend outwardly of said outer end, each of said tube holders also including a movably mounted clamping jaw having an anvil selectively located over said channel for pressing against a tube in said channel, said outer ends of said tube holders being disposed toward and spaced from each other, and a wafer mounted for movement through said space for contacting a portion of a tube extending outwardly of said outer end of said channel, the improvement being in that said walls of said channel are outwardly flared at said outer end.

2. The device of claim 1 wherein said outward flare is at an angle of about 14°.

3. The device of claim 1 wherein said outward flare is at angle of 13½°–14½°.

4. The device of claim 3 wherein said wafer includes aligned scoops on each side thereof.

5. The device of claim 4 wherein the upper corners of said walls are outwardly inclined at said outer end to provide relief surfaces.

6. The device of claim 5 wherein said walls are inclined toward each other inwardly of said upper corners.

7. The device of claim 6 wherein the spacing between said outer ends is slightly greater than the distance between the outer ends of said scoops.

8. The device of claim 7 wherein said anvil includes an outwardly extending portion tapered at the same angle as said flared walls of said channel.

9. The device of claim 3 wherein the upper corners of said walls are outwardly inclined at said outer end to provide relief surfaces.

10. The device of claim 8 wherein said walls are inclined toward each other inwardly of said upper corners.

11. The device of claim 1 wherein said anvil includes an outwardly extending portion tapered at the same angle as said flared walls of said channel.

* * * * *